United States Patent
Johnson

(10) Patent No.: US 6,655,872 B1
(45) Date of Patent: Dec. 2, 2003

(54) METHOD, SYSTEM, AND DEVICE FOR DEPLOYING A CONTAINMENT BOOM

(76) Inventor: Richard C. Johnson, 225 Tully St., Paducah, KY (US) 42003-0170

(*) Notice: Subject to any disclaimer, the term of this patent is extended or adjusted under 35 U.S.C. 154(b) by 0 days.

(21) Appl. No.: 09/998,198

(22) Filed: Dec. 3, 2001

Related U.S. Application Data
(60) Provisional application No. 60/251,199, filed on Dec. 4, 2000.

(51) Int. Cl.[7] ............................................. E02B 15/04
(52) U.S. Cl. ............................. 405/66; 405/63; 405/65; 210/242.1
(58) Field of Search ............................. 405/63, 65, 66; 210/242.3, 242.1

(56) References Cited

U.S. PATENT DOCUMENTS

| | | | | |
|---|---|---|---|---|
| 770,078 A | * | 9/1904 | Kruger | 114/229 |
| 932,720 A | * | 8/1909 | Reinhardt | 114/229 |
| 2,240,567 A | * | 5/1941 | Meachum et al. | 405/65 |
| 4,348,136 A | * | 9/1982 | Donovan | 405/65 |
| 5,298,175 A | * | 3/1994 | Whidden, Jr. | 210/776 |
| 5,372,455 A | | 12/1994 | Tarca | 405/68 |
| 5,863,440 A | * | 1/1999 | Rink et al. | 210/693 |
| 5,971,660 A | * | 10/1999 | Duchesneau et al. | 405/65 |
| 6,024,512 A | * | 2/2000 | Mosley | 405/65 |
| 6,143,172 A | * | 11/2000 | Rink et al. | 210/237 |
| 6,269,763 B1 | * | 8/2001 | Woodland | 114/382 |

OTHER PUBLICATIONS

"Magnetic Hull Connectors" dated Mar. 25, 1999, from www.elastec.com/hullConnect.html—Adobe PDF Drawing 1999A and www.elastec.com/hullcontainB.html; 3 pages.*

Oil Containment Boom, 9 pages, of Hoffman Services Maritime; including Boom end connectors, 3 pages, dated Feb. 21, 1998, 12 pages total, from www.webcon.com/~maritime/response/boom.html and www.webcon.com/~maritime/response/endcon.html.*

COPDEL Oil Spill Control Equipment, FAQ 5 pages, Products, 2 pages, and Specifications for the Protecteur Series Equipment, 2 pages, all © 1999 from www.copdel.com.*

CCMS Product Manufacturing and Distribution Catalogue 2001–2002, undated, 21 pages, from www.ccmsusa.com.*

Print out of http://www.magnapatch.com/MagnaPatch/Technology.html, one page, no date.

Print out of http://www.magnapatch.com/MagnaPatch/Howworks.html, one page, no date.

* cited by examiner

Primary Examiner—J. J. Swann
Assistant Examiner—Katherine Mitchell
(74) Attorney, Agent, or Firm—George T. Marcou; Kilpatrick Stockton LLP

(57) ABSTRACT

A method, system, and device for deploying an oil spill containment boom at the side of a ship, barge, or other steel structure. Each end of the boom is connected to its own device that is configured to attach to a generally vertical surface of a steel-hulled ship. Attachment occurs through the use of magnetic force. Instead of encircling the entire ship with a boom, the device permits the establishment of specific containment areas around the ship. The device engages and disengage the side of the ship through the use of a cam and lever assembly to counter the magnetic force.

16 Claims, 8 Drawing Sheets

METHOD, SYSTEM, AND DEVICE FOR DEPLOYING A CONTAINMENT BOOM

CROSS-REFERENCE TO RELATED APPLICATIONS

This application claims priority to, and herein incorporates by reference in its entirety, applicant's U.S. Provisional Application No. 60/251,199 filed Dec. 4, 2000 now abandoned.

FIELD OF THE INVENTION

The present invention relates generally to a method, system, and device for attaching an object near the waterline of a marine structure. More particularly, but not by way of limitation, the invention relates to a method, system, and device for deploying an oil spill containment boom by magnetically attaching the ends of the boom to the side of a ship's hull.

BACKGROUND

Spilled oil and/or other fluids that are lighter than water and, thus, float on water have long been recognized as an environmental hazard. At the same time, the transportation of oil and other fluids by ships, barges and other vessels on waterways is becoming more prevalent.

When an oil spill occurs, the common method for containing the spill is to surround the entire marine structure (ship, boat, barge, seaplane, submarine, oil rigs, pier, etc.) that is the source of the spill, as well as, the spilled oil. To cover such a large area requires a lengthy containment boom and significant manpower. To effectively contain the spill involves utilizing a small boat, crew members on the boat, as well as, crew members on the marine structure, and importantly, availability of a boom that is of sufficient length to encircle the entire marine structure and the rapidly expanding spill. Typically, such a lengthy boom is not carried onboard a ship and is not immediately accessible by dock personnel at pier side. Cruise ships are often required to carry a lengthy boom onboard, however, they must sacrifice valuable space and resources to satisfy this requirement.

This traditional method of encircling an entire marine structure has proven to be an inefficient way to contain localized spills including, for example, contamination from drainage and overflow outlets.

Accordingly, there is a need for an improved method, system, and device for deploying an oil spill containment boom to efficiently and cost-effectively contain oil spills and to minimize contamination of surrounding water.

SUMMARY OF THE INVENTION

The present invention overcomes the above-noted and other shortcomings by providing a novel and improved method, system, and device that meet the aforementioned needs. An embodiment of the present invention is the deployment of an oil spill containment boom that is capable of being attached to the vertical surface of a marine structure (ship, boat, barge, seaplane, submarine, oil rig, pier, etc.) to contain localized areas of spilled oil and/or other fluids that are lighter than water. Because of the features of the present invention and the need for only a relatively short containment boom, advantages of the present invention are its rapid deployment capabilities, ease of use, cost effectiveness, and ability to satisfy a variety of requirements based on the location and scope of the contamination. Further, the present invention greatly reduces onboard storage requirements and provides point-source control for spills (the point where the contaminant enters the water). The light weight of an embodiment of the inventive device makes it highly portable and allows a single person to lower and deploy the device.

The present invention is not limited in its application to containment booms. Other applications utilizing the present invention include, as an example, positioning fenders along the side of the hull of a ship, or serving as an attachment point for a line, cable, sign, barrier, platform or other objects.

The present invention provides for the attachment of objects at the waterline of marine structures. The attachment is enabled by permanent magnets, electromagnets, suction devices, adhesives, screws/bolts, and other known methods to bring two materials together. An embodiment of the present invention utilizes permanent magnets, for example, rare earth and ceramic 8 magnets, to allow the attachment of an oil spill containment boom to the side(s) of a steel hulled vessel. Such embodiments may also be used with non-steel hulled vessels, so long as the vessels are retrofitted with strategically placed steel attachment plates.

Once attached to the marine structure, the device of the present invention is disengaged from the marine structure in a variety of ways, for example, by force of separation through human, mechanical, electrical, and/or chemical methods. An embodiment of the present invention that utilizes a mechanical disengagement method involves the detachment by use of a cam and lever assembly, whereby the lever arm tips extend outward from the inventive device and forces the device away from the marine structure.

Another embodiment of the present invention is configured with a universal connector that allows the attachment of a variety of containment booms, those that are unique and those that are more conventional. Because the present invention utilizes a relatively short boom length to effectively contain a spill, greater flexibility is provided for utilizing and storing a variety of boom types. Further, because both ends of the containment boom are capable of being quickly attached and detached from the marine structure, the containment boom can be easily repositioned and adjusted given the condition of the spill and environmental factors.

A method according to the present invention comprises attaching each end of a boom to a corresponding mounting device, the device then being attached to a marine structure. The boom and two mounting devices are then lowered into the water from over the side of the marine structure by mechanical force, for example, a crane, or by human force. Another methodology involves placing the mounting devices, with the boom attached, on a separate craft, for example a small boat, and then transporting the mounting devices to the specific locations at the marine structure.

A method for lower the mounting device over the side of the marine structure comprises maintaining tension on a release cable which automatically extends the lever arm tips and prevents the mounting device from engaging the surface of the marine structure. As the mounting device reaches the water, the buoyancy of the device allows it to float. As more line is fed out the release cable slacks and the cam and lever assembly allows the lever arm tips to automatically rotate into a retracted position, thereby allowing the attachment force, for example, magnetism, to draw the mounting device to the marine structure.

A further embodiment of the present invention includes a device for mounting onto a generally vertical surface of a marine structure, comprising: a body; a top portion of the body; at least one side portion of the body; a buoyant material affixed to the body, and wherein the buoyant material is sufficient to keep the body afloat in a body of water associated with the marine structure. Additionally included is a first fitting affixed to the top surface of the body, wherein the first fitting is used to control the vertical movement of the body; an engagement element affixed to the at least one side of the body, wherein the engagement element is configured to attach to the generally vertical surface of the marine structure; and a second fitting, for example, a universal boom connection, affixed to the body for linking an object, such as a containment boom, to the generally vertical surface of the marine structure.

Other embodiments further comprise a disengagement arrangement for separating the engagement element from the generally vertical surface of the marine structure, wherein the disengagement arrangement comprises: an arm; a distal end of the arm; and a proximal end of the arm; wherein the distal end of the arm is configured to contact the generally vertical surface of the marine structure; and wherein the arm is configured to detach the engagement element from the generally vertical surface of the marine structure. Additionally, also included is at least one collar, wherein the at least one collar is configured to be partially submerged in the body of water; and wherein the at least one collar extends from the body for contacting the generally vertical surface of the marine structure.

Another embodiment of the present invention is a system for deploying a containment boom, comprising: a containment boom; at least one marine structure bounded by a body of water, the marine structure having a waterline. Also included is a mounting device; a lowering and lifting arrangement for lowering and lifting the mounting device; and wherein the mounting device has an engagement element that attaches the mounting device to a surface of the marine structure near the water line. Further, the mounting device has a fitting at a top portion of the mounting device for connection to the lifting and lowering arrangement, such as a crane; at least one boom connector affixed to the mounting device; and wherein the containment boom is connected to the mounting device with the use of the at least one boom connector. The system further comprises a vessel for positioning the mounting device at the surface of the marine structure.

Still a further embodiment of the present invention is a method for deploying a containment boom, comprising the steps of: positioning a magnetic mounting device adjacent an end of a containment boom; sliding a boom connector attached to the magnetic mounting device into a corresponding boom connector attached to the containment boom; lowering the magnetic mounting device and the containment boom toward a body of water, a cable or line being attached to the mounting device; and activating a cam assembly by controlling tension on the cable or line, wherein the cam assembly projects an arm extending past a contact face of a magnet in the magnetic mounting device. The method further includes positioning the magnetic mounting device adjacent a generally vertical surface of a first marine structure; allowing the magnetic mounting device to float on a surface of the body of water; providing slack on the cable or line thereby deactivating the cam assembly wherein the arm retreats to behind the contact face of the magnet; permitting the magnetic mounting device to be drawn toward and contact the generally vertical surface of the first marine structure, and utilizing a second marine structure, such as a small vessel, for assisting in positioning the mounting device at a desired location at the generally vertical surface of the first marine structure.

Other advantages and novel features of the present invention will become apparent in the following detailed description when considered in conjunction with the accompanying drawings.

BRIEF DESCRIPTION OF THE DRAWINGS

The present invention is shown by way of example and not by limitation in the accompanying figures, in which.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the appended claims and their equivalents.

Figure 1:
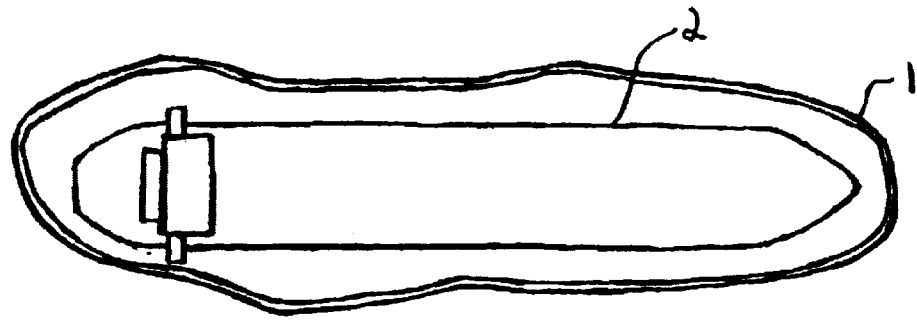
FIG. 1 is a top view of a ship with the conventional deployment of an oil boom encircling the ship.

FIG. 1 shows the traditional method for deploying a containment boom 1. The boom 1 fully encircles a marine structure 2, for example, a ship, boat, barge, seaplane, submarine, oil rig, pier, in order to contain fluids that are floating at or near the surface of the water, such as oil. As can be seen, a great deal of time and expense is involved in fully encircling a large structure.

Figure 2:
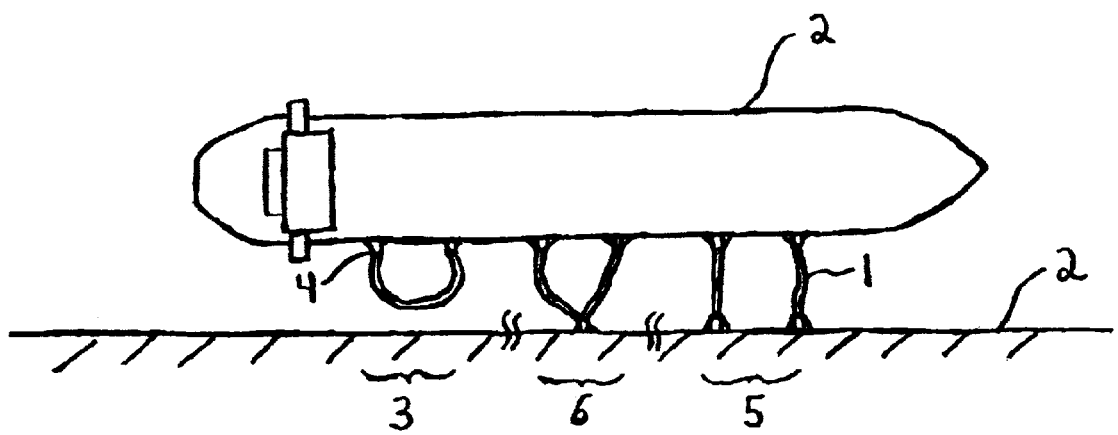
FIG. 2 is top view of a ship and pier utilizing embodiments of the present invention.

FIG. 2 shows several embodiments whereby a containment boom 1 of the present invention is deployed. Examples include, for example, a ship-only (or shore-only) configuration; and a ship-to-shore (or ship-to-ship) configuration. The present invention eliminates the need to fully encircle the structure with a containment boom 1. One embodiment includes a first configuration 3 whereby both ends of the boom 1 are attached to the same vessel 2 (or other structure) with mounting devices 4. A second configuration 5 illustrates two sets of boom 1 lengths running parallel to each other from the vessel 2 to another marine structure 2, for example a pier. In this case, the pier 2 is a solid pier and itself serves as a containment barrier. A third configuration 6 shows the use of three mounting devices 4 whereby one is mounted at a non-solid pier 2 and has two connector assemblies so that two lengths of boom 1 are used and the ends of each length of boom 1 are attached to the hull of the vessel (or other structure) 2. One skilled in the art can appreciate that there are numerous variations as to the number and location for placement of the mounting devices of the present invention.

Figure 3:
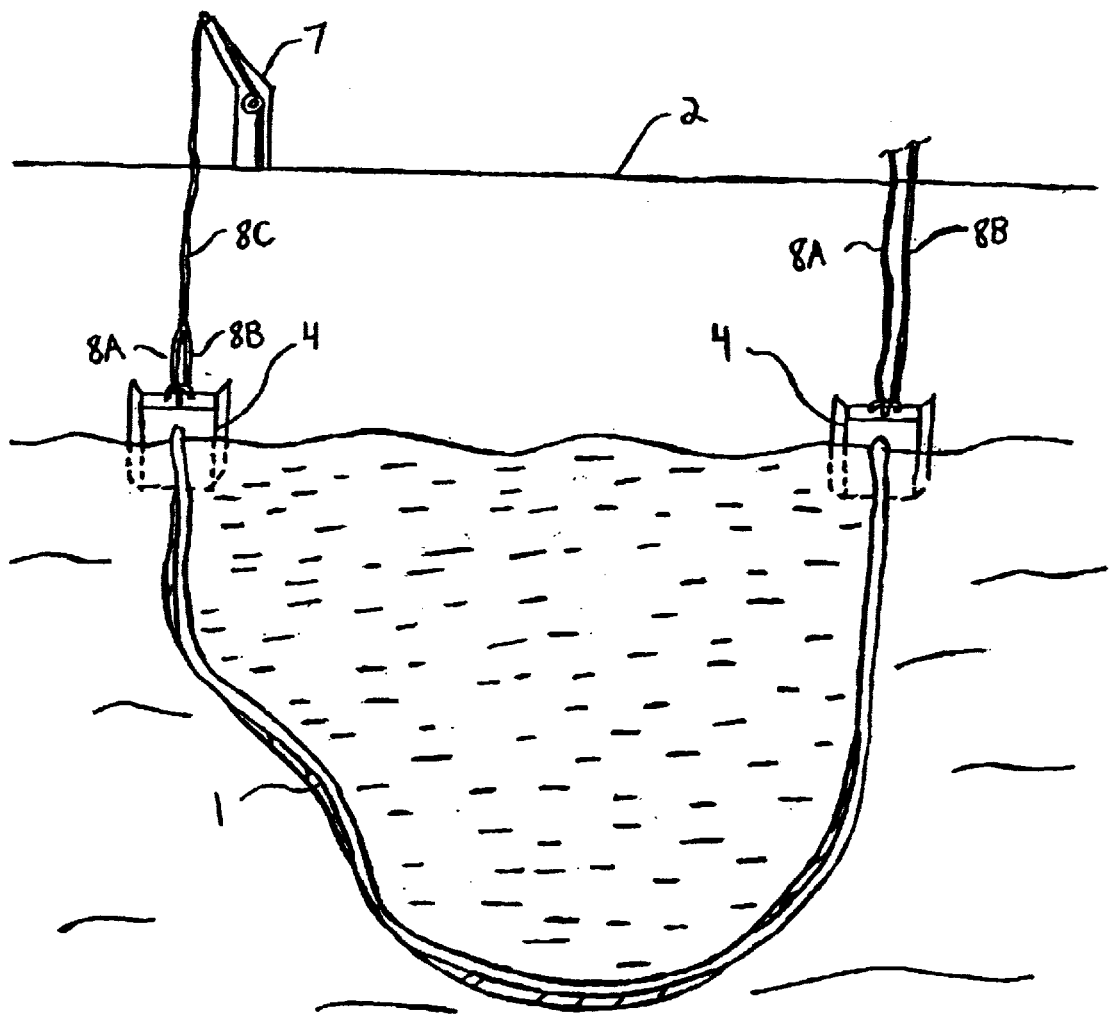
FIG. 3 is a side view of an embodiment of the system of the present invention.

FIG. 3 illustrates an embodiment of the system of the present invention. In this embodiment, two mounting devices 4 are utilized. Also shown is a crane 7 for lowering, hoisting, and controlling the mounting devices 4 with lines (8A, 8B, 8C) cables, rope, etc. There are several configurations available for using the lines. Other embodiments do not involve mechanical systems like cranes 7 on the marine structure 2 but rather utilize human force for lowering and hoisting the mounting devices 4. Further embodiments involve utilizing personnel on a small boat to position the mounting device 4 at the desired location through human force or mechanical means.

Figure 4:
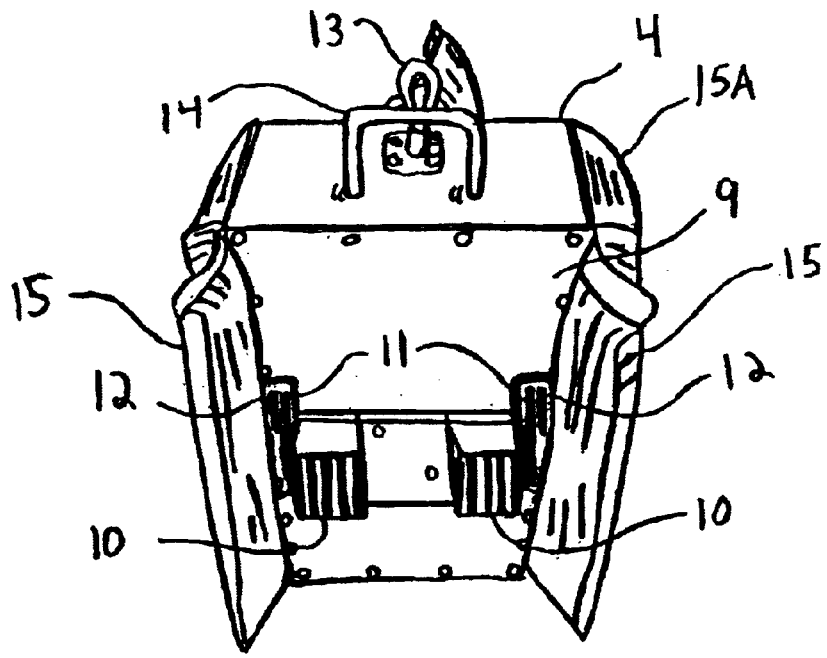
FIG. 4 is a view of the contact face of an embodiment of the device of the present invention.

FIG. 4 shows the contact face 9 and top view of an embodiment of the mounting device 4 of the present invention. The mounting device 4 in this embodiment is a rectangular shaped body. The contact face 9 of the mounting device 4 is the side that would be placed adjacent the vertical surface of the marine structure 2. The mounting device 4 comprises at least one engagement element, for example, a magnet 10. In this embodiment there are two magnets 10 and the magnets are permanent magnets, for example, rare earth or ceramic 8 magnets that exert 450 lbs of pressure each. The magnets 10 shown are stationary and are padded by oil resistant foam to allow for some variance in the contact surface of the marine structure 2. Other embodiments provide for moveable magnets 10, suction devices, etc. to compensate for variances in the surface of the marine structure 2.

Adjacent to the magnet 10 is the yoke support 11 and cam lever tips 12 (shown in greater detail in FIGS. 9, 10, 11, and 12). The cam lever tips 12 are shown in their retracted position. The cam lever tips 12 are connected to the release cable 13 that protrudes through the top of the mounting device 4. The end of the release cable 13 comprises an eye connection to enable attachment of a hook or other linkage. A line 8A (FIG. 5) may be attached to provide extended length to the release cable 13.

Also extending from the top of the mounting device is a fitting, for example, a handle 14 in the shape of an inverted "U." The handle 14 is configured such that an individual may place a hand around the handle and lift the mounting device 4. The handle 14 can support the weight of the mounting device 4 and the objects connected to the mounting device 4.

Projecting from the contact face 9 of the mounting device 4 are collars 15. When the mounting device is attached to the marine structure 2, the device 4 itself, as well as, the collars 15 provide a barrier for the contaminant at the area abutting the marine structure 2. The collars 15 may be made from flexible materials, such that they move upon contact with the marine structure 2.

At the sides of the mounting device 4 are external floatation components 15A. The floatation component 15A is preferably fabricated from a plastic and/or foam material and is substantially less dense than water to allow flotation of the device 4. The mounting device 4 also has internal flotation components. Both external 15A and internal flotation components may comprise of any number of known flotation materials.

The mounting device 4 may be made from a variety of materials that are suitable for the given environment (salt water, fresh water, other chemical considerations, etc.) and the method of engagement (magnetic considerations, strength of materials, etc.). An embodiment of the mounting device 4 is made from corrosion resistant materials, such as, stainless steel, silicon bronze, and marine-grade aluminum. The contact face 9, as well as other portions of the body, may be fabricated as a welded assembly from an aluminum alloy, such as 6061 aluminum alloy.

Figure 5:
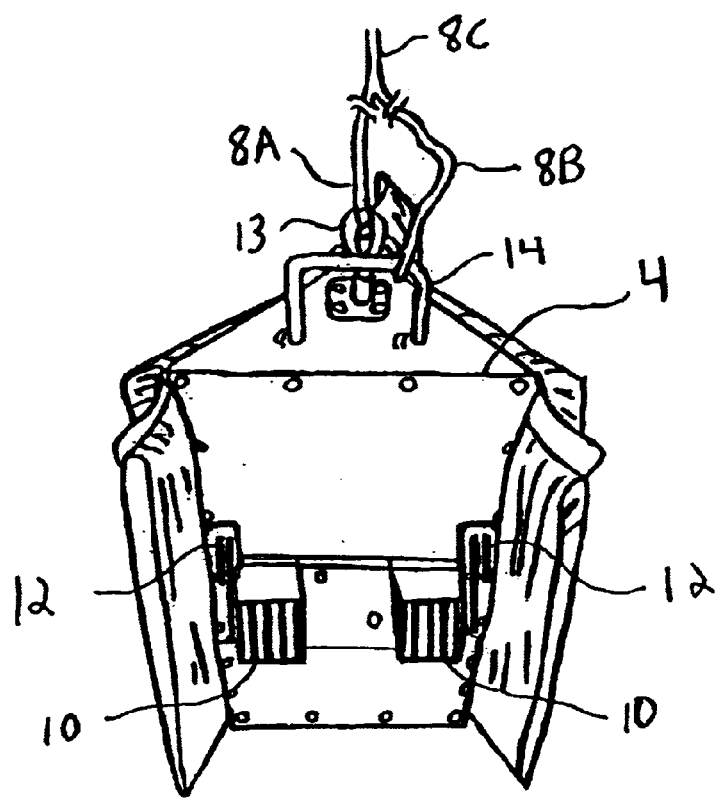
FIG. 5 is a view of the contact face of another embodiment of the device of the present invention.

Although the embodiment depicted in FIG. 4 shows a generally rectangular shape for the mounting device 4, the device 4 need not be limited to a particular shape. A triangular embodiment of the mounting device 4 is shown in FIG. 5. FIG. 5 also depicts a methodology for the automatic extension of the cam lever tips 12 during the lowering and hoisting of the mounting device 4, thereby preventing the contact face of the magnets 10 from contacting and engaging the steel structure 2 as the mounting device 4 is being raised and lowered into position.

Line 8C (cable, rope, etc) is integral with or is otherwise connected to lines 8A and 8B. Line 8B is secured around the handle 14 and carries the majority of the weight of the mounting device 4 during the hoisting and lowering operation. Line 8A is connected to the release cable 13 and is used to raise the release cable 13 to extend the cam lever tips 12. In one embodiment, when there is no tension on line 8A, the release cable 13, by force of gravity, will retract into the mounting device 4 resulting in the cam lever tips 12 retracting to a position behind the face of the magnets 10, thereby allowing the magnets 10 to contact and engage the marine structure 2. The release cable 13 will retract when, for example, the mounting device 4 is floating on the water and tension is released in line 8A.

Figure 9:
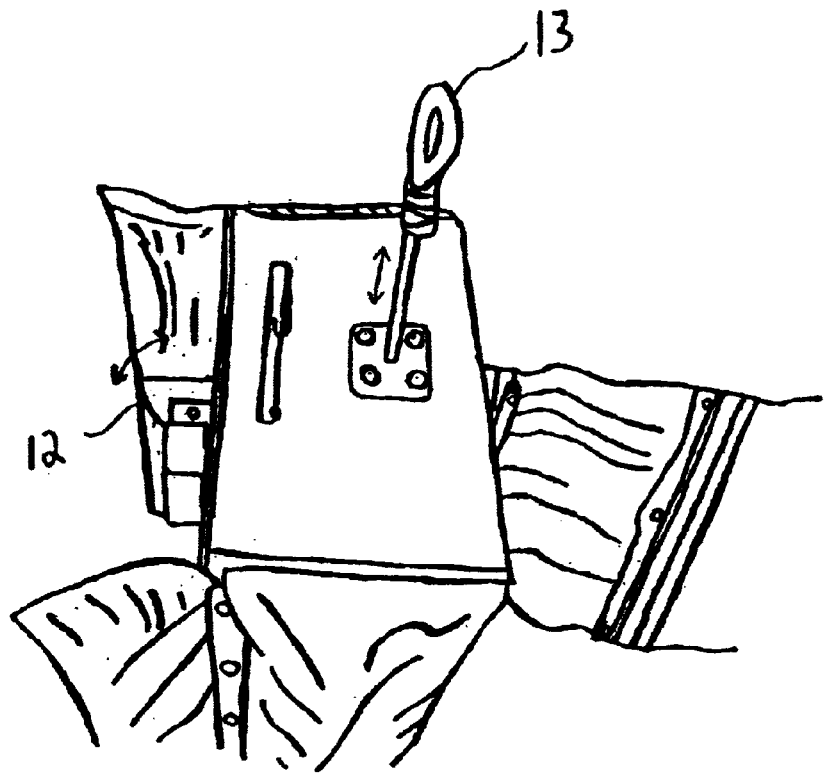
FIG. 9 is an illustration of an embodiment of the present invention utilizing a disengagement cam lever assembly.

An embodiment of the automatic actuation of the cam lever tips 12 involves having a single line 8C branch into lines 8A and 8B. Line 8A is shorter than line 8B such that, for example, when the mounting device 4 is being raised, tension is first applied to the release cable 13, pulling it upward from the mounting device 4, thereby causing the cam lever tips 12 to protrude past the face of the magnets 10 (FIG. 9). At a point before which the release cable 13 has reached its maximum extended position, tension results in line 8B, allowing line 8B, which is connected to the handle 14, to lift and carry the majority of the weight of the mounting device 4. Similarly, during the lowering operation, lines 8A and 8B are tensioned. Line 8B is carrying the majority of the weight of the mounting device 4 and line 8A is keeping the release cable 13 in an extended position. As the device 4 contacts the water and begins to float, tension is released in line 8B. Tension may also then be released in line 8A by lowering line 8C such that the release cable 13 is in its retracted position in the mounting device 4.

Figure 6:
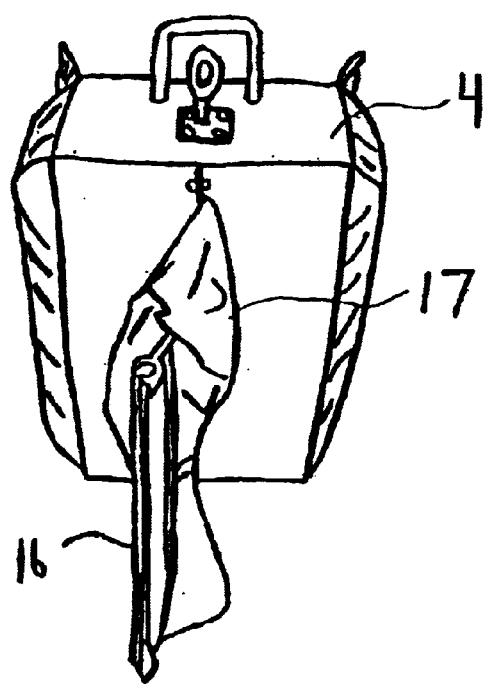
FIG. 6 is a view of the distal face of an embodiment of the device of the present invention with a containment boom connection interface.
Figure 8:
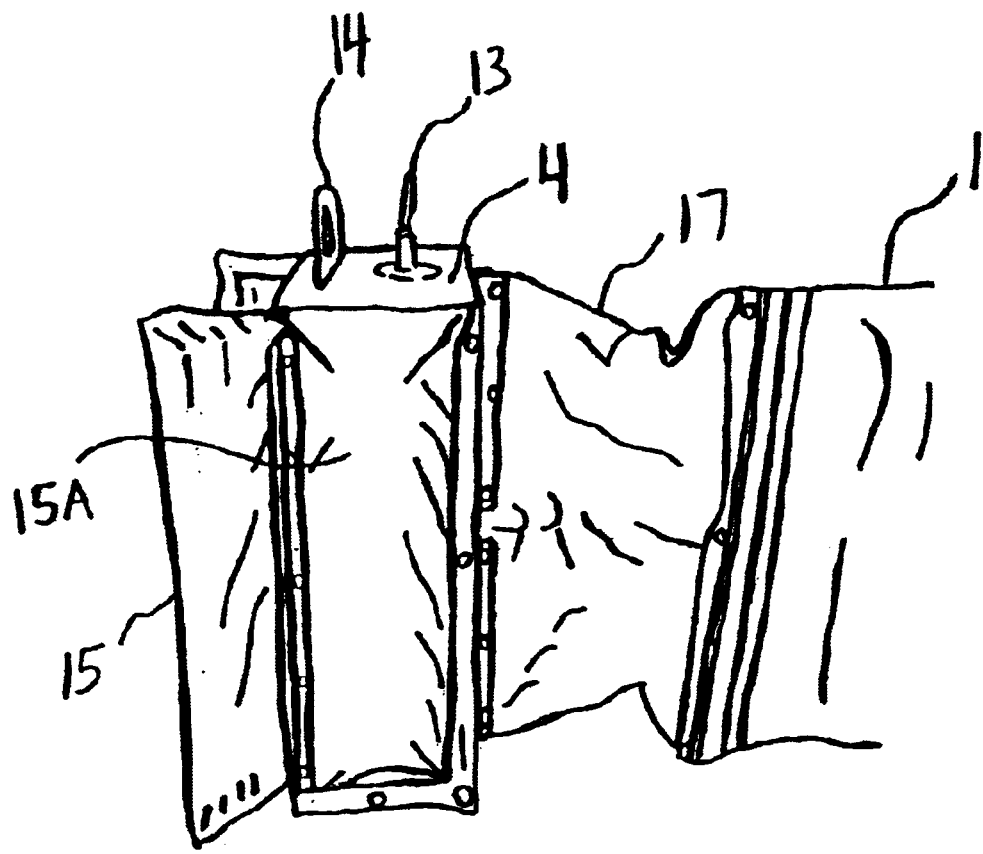
FIG. 8 is a side view of an embodiment of the present invention with an attached containment boom.

FIG. 6 shows a back view of an embodiment of the present invention. The embodiment shown has a fitting, for example, a universal connector 16 for oil containment booms 1. The universal connector 16 is a connection interface that connects to an oil boom 1 by allowing the corresponding universal connector on the boom 1 to slide down within the grooves of the universal connector 16 on the mounting device 4 (FIG. 8). A flexible tail curtain 17 connects the mounting device 4 to the universal connector 16. The present invention does not however require a universal connector 16. Any customized or standard connector may be utilized. Further, as illustrated in the triangular boom configuration 6 in FIG. 2, a single mounting device 4 may have multiple tail curtains 17 with universal connectors 16 attached for connection to multiple booms 1.

Figure 7:
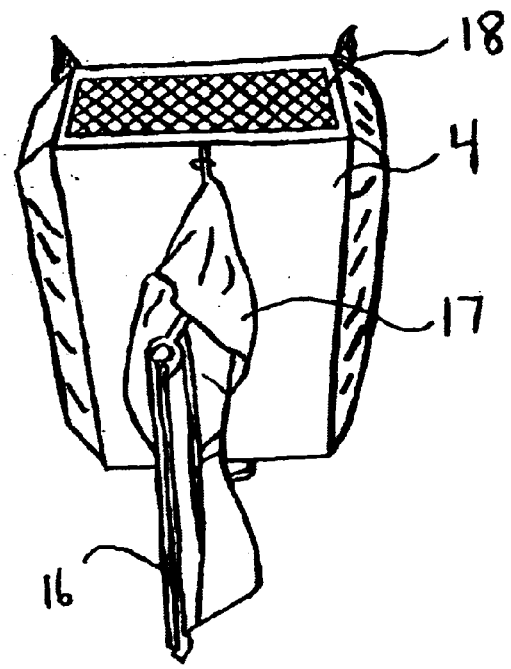
FIG. 7 is a view of the bottom of an embodiment of the device of the present invention.

FIG. 7 shows a bottom view of an embodiment of the mounting device 4. The bottom of the mounting device 4 includes a grate panel 18 extending over a majority of the bottom surface.

FIG. 8 shows a side view of an embodiment of the mounting device 4 of the present invention with a containment boom 1 attached.

FIG. 9 shows a side view of an embodiment of the device 4 of the present invention, as well as, the coordinated motion of the cam lever tips 12 and the release cable 13.

Figure 10:
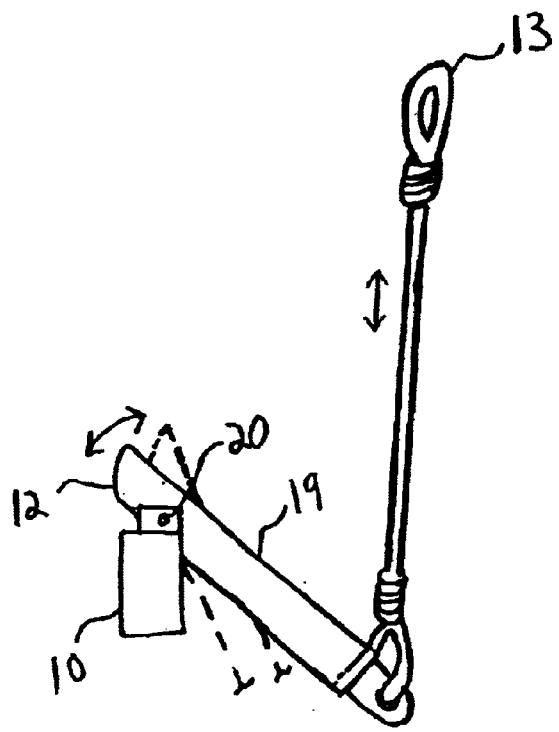
FIG. 10 is a side illustration of an embodiment of a disengagement cam lever assembly used to disengage a permanent magnet.

FIG. 10 shows a side view of a cam and lever assembly without the body. Illustrated is the release cam yoke 19 with two arms that form the cam lever tips 12. By moving the release cable 13, which is located adjacent the proximal end of the arms, upward, there is a resulting movement of the cam lever tips 12, the distal end of the arms, downward about a pivot point 20. The cam lever tips 12 emerge beyond the face of the magnet 10. This action forces the magnet 10 away from the engaged surface.

Figure 11:
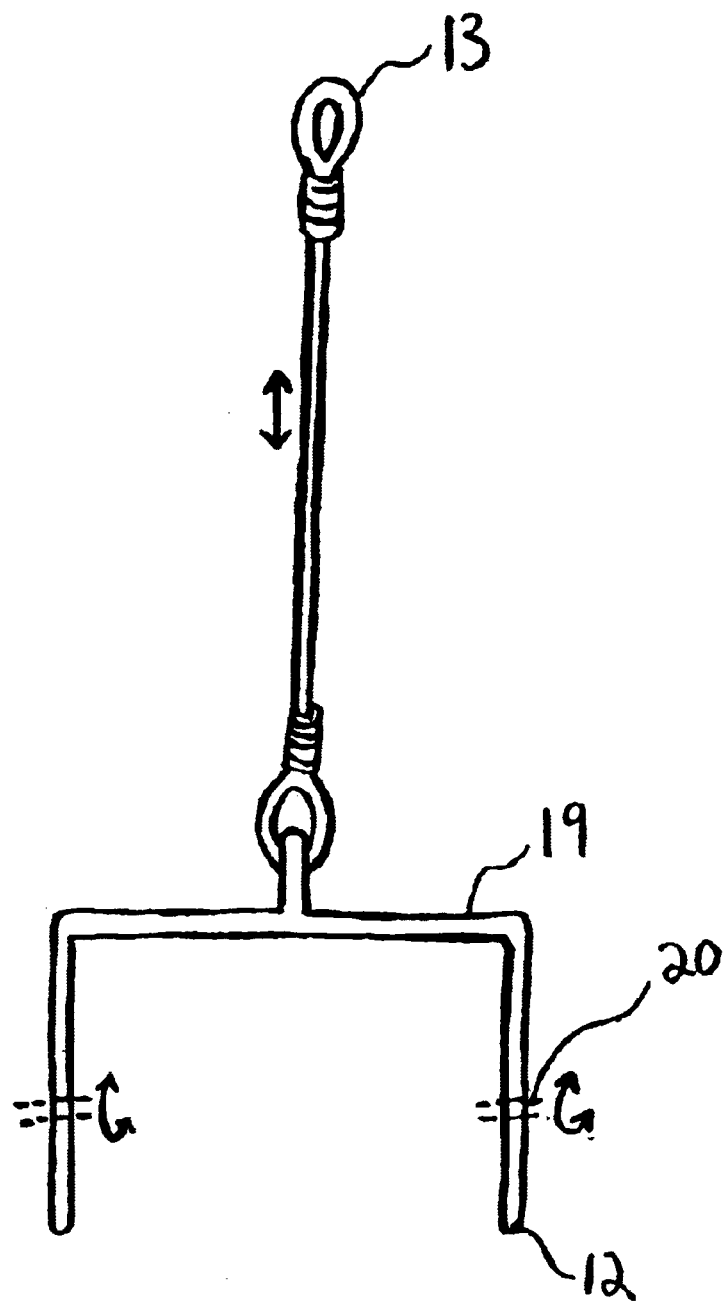
FIG. 11 is a front illustration of an embodiment utilizing a disengagement cam lever assembly.

FIG. 11 shows a front view of the cam and lever assembly shown in FIG. 10. As can be seen from the front view, an embodiment of the present invention comprises a U-shaped release cam yoke 19.

Figure 12:
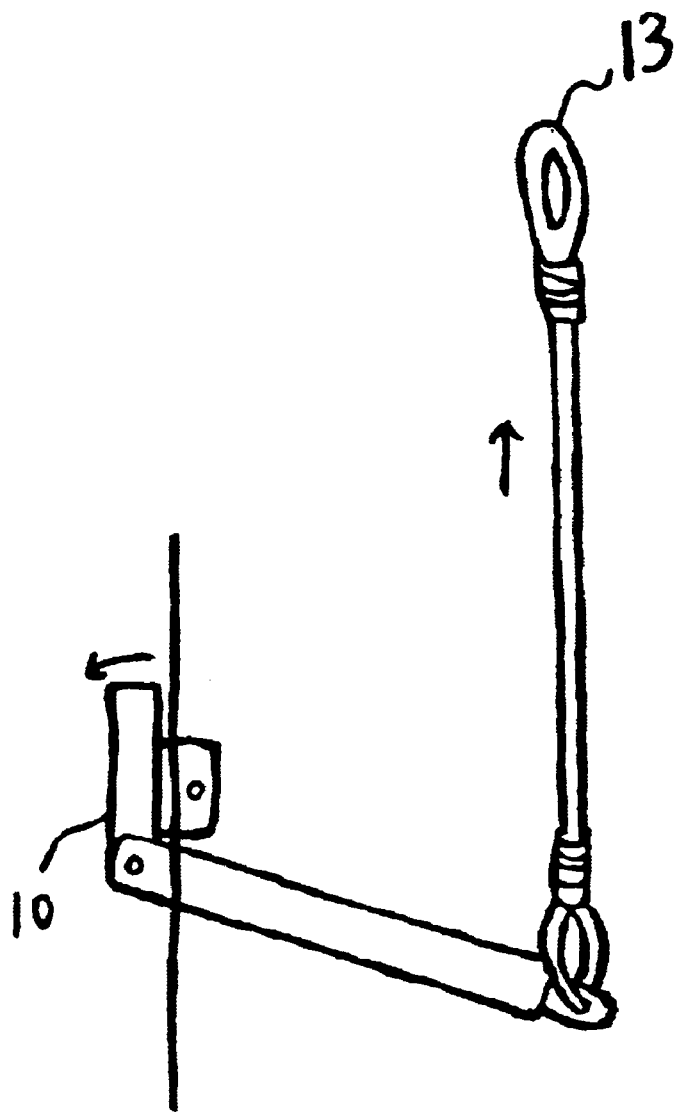
FIG. 12 is a side illustration of another embodiment of a disengagement cam lever assembly used to disengage a permanent magnet.

FIG. 12 illustrates another embodiment of a cam and lever assembly whereby movement of the release cable 13 causes a rotation of the magnet 10 itself thereby weakening and disengaging the magnetic face contact.

Methodologies of the present invention include the engagement and disengagement of the mounting device 4 to a marine structure 2, as well as, methodologies for deploying a containment boom 1. Because embodiments of the present invention involve a relatively light weight mounting device 4, it may be lowered into the water and deployed by a single person. The mounting device 4 may be deployed from over the side of a marine structure 2 or from a small boat.

Further, the mounting device 4 may be pre-attached to a boom 1 prior to placing the device 4 and boom 1 into the water. Personnel in a small boat can then position and attach the contact face 9 of the mounting device 4 to a smooth spot on the marine structure 2. The magnets 10 on the mounting device 4 will automatically draw the device 4 to the vertical surface and remain attached to the structure 2. Just by placing the device 4 close to the steel structure 2, for example, within two to three inches from the structure 2, will cause the device 4 to jump to the structure 2 by magnetic force, once the cam lever tips 12 are retracted.

To disengage the mounting device 4, the personnel in the small boat pull vertically, for example, two (2) feet on the release cable 13 to extend the cam lever tips 12 beyond the face of the magnet 10. The mounting device 4 will then be forced away from the structure.

The present invention also includes the methodology for deploying the device 4 from over the side of the marine structure 2. The device 4 is pre-attached to the containment boom 1 prior to placing the device 4 and boom 1 into the water. The mounting device 4 is then lowered to the water over the side of the structure 2 by use of line 8B. Most marine structures 2 have relatively flat vertical surfaces extending to the waterline. As a result, the mounting device 4 may be lowered directly down to the point of attachment. Ships 2, especially large tankers, have hulls that extend generally straight from the deck to the waterline. It is at a point below the waterline where significant hull curvature results.

Once the device 4 is in the water floating, personnel aboard the structure 2, while keeping tension on the release cable 13, position the contact face 9 of the device 4 adjacent a smooth vertical portion of the structure 2. The personnel will then fully release tension on release cable 13, allowing the magnets 10 to draw the device 4 towards the hull and establish contact.

Although the present invention has been described above in detail, it is by way of illustration and example only and is not to be taken as a limitation on the present invention. Accordingly, the scope and content of the present invention are to be defined only by the terms of the appended claims.

I claim:

1. A device for mounting onto a generally vertical surface of a marine structure, comprising:

a body;

a top portion of the body;

at least one side portion of the body;

a buoyant material affixed to the body, wherein the buoyant material is sufficient to keep the body afloat in a body of water associated with the marine structure from which the body was deployed;

a first fitting affixed to the top portion of the body, wherein the first fitting is used to control a vertical movement of the body;

a magnet affixed to the at least one side of the body, wherein the magnet is configured to attach to the generally vertical surface of the deploying marine structure;

a second fitting affixed to the body for linking an object to the generally vertical surface of the marine structure;

a disengagement arrangement for separating the magnet from the generally vertical surface of the marine structure;

wherein the disengagement arrangement comprises:

an arm;

a distal end of the arm; and a proximal end of the arm;

wherein the distal end of the arm is configured to contact the generally vertical surface of the marine structure; and wherein the arm is configured to detach the magnet from the generally vertical surface of the marine structure; and whereby the distal end of the arm extends beyond a contact face of the magnet during a lowering of the device; and whereby the distal end of the arm retreats behind the contact face of the magnet when the device is allowed to float in the body of water, thereby permitting the magnet to contact the generally vertical surface of the marine structure.

2. The device in accordance with claim 1, wherein the magnet is a permanent magnet.

3. The device in accordance with claim 1, wherein the magnet is an electromagnet.

4. The device in accordance with claim 1, wherein the object is a containment boom.

5. The device in accordance with claim 4, further comprising:
- at least one collar, wherein the at least one collar is configured to be partially submerged in the body of water; and
- wherein the at least one collar extends from the body for contacting the generally vertical surface of the marine structure.

6. The device in accordance with claim 1, wherein the marine structure is a steel-hulled vessel.

7. The device in accordance with claim 1, wherein the second fitting is a universal boom connection.

8. A system for deploying a containment boom, comprising:
- a containment boom;
- at least one marine structure bounded by a body of water, the marine structure having a waterline;
- a mounting device;
- a lowering and lifting arrangement for lowering and lifting the mounting device from the marine structure;
  - wherein the mounting device has a magnet that attaches the mounting device to a surface of the marine structure near the water line;
  - wherein the mounting device has a fitting at a top portion of the mounting device for connection to the lifting and lowering arrangement;
  - wherein a buoyant material is affixed to the mounting device, the buoyant material sufficient to keep the mounting device afloat;
- at least one boom connector affixed to the mounting device;
  - wherein the containment boom is connected to the mounting device with the use of the at least one boom connector;
- a disengagement arrangement for separating the magnet from the surface of the marine structure;
- wherein the disengagement arrangement comprises:
  - an arm;
  - a distal end of the arm; and
  - a proximal end of the arm;
    - wherein the distal end of the arm is configured to contact the surface of the marine structure; and
    - wherein the arm is configured to detach the magnet from the surface of the marine structure; and
- whereby the distal end of the arm extends beyond a contact face of the magnet during a lowering of the device, and
- whereby the distal end of the arm retreats behind the contact face of the magnet when the device is allowed to float in the body of water, thereby permitting the magnet to contact the generally vertical surface of the marine structure.

9. The system in accordance with claim 8, wherein the marine structure is a vessel.

10. The system in accordance with claim 8, wherein the lowering and lifting arrangement comprises machinery.

11. The system in accordance with claim 10, wherein the machinery is a crane.

12. The system in accordance with claim 8, further comprising:
- a vessel for positioning the mounting device at the surface of the marine structure.

13. A method for deploying a containment boom, comprising the steps of:
- positioning a magnetic mounting device adjacent an end of a containment boom;
- connecting a boom connector attached to the magnetic mounting device into a corresponding boom connector attached to the containment boom;
- lowering the magnetic mounting device and the containment boom from a marine structure toward a body of water, a cable or line being attached to the mounting device;
- activating a cam assembly by controlling tension on the cable or line;
  - wherein the cam assembly projects an arm extending past a contact face of a magnet in the magnetic mounting device;
- positioning the magnetic mounting device adjacent a generally vertical surface of the marine structure;
- allowing the magnetic mounting device to float on a surface of the body of water;
- providing slack on the cable or line thereby deactivating the cam assembly wherein the arm retreats to behind the contact face of the magnet; and
- permitting the magnetic mounting device to be drawn toward and contact the generally vertical surface of the marine structure.

14. The method of claim 13 further comprising the step of:
- utilizing a second marine structure for assisting in positioning the mounting device at a desired location at the generally vertical surface of the marine structure.

15. The method of claim 14 wherein the second marine structure is a vessel.

16. The method of claim 13 wherein the boom connector is a universal boom connector.

* * * * *